March 15, 1932. C. H. CREED, JR 1,849,790
SELF STEERING DEVICE FOR TRACTORS
Filed Jan. 22, 1931

Inventor:
Charles H. Creed, Jr.

Patented Mar. 15, 1932

1,849,790

UNITED STATES PATENT OFFICE

CHARLES H. CREED, JR., OF ABERDEEN, SOUTH DAKOTA

SELF STEERING DEVICE FOR TRACTORS

Application filed January 22, 1931. Serial No. 510,484.

My present invention has preference to a guide for tractors, and my primary object is the provision of a device for this purpose that shall be of a simple nature, light in weight, cheap in construction, easy running, strong and durable, easily and quickly attached or removed, which will accurately steer the tractor along a plow furrow without any attention from the driver of the tractor, which in action develops no side draft on the front wheels due to back thrust engendered by resistance of soil, rubbish, or other obstacles to progression, which may be elevated when the tractor is turned, and which when elevated presents the least possible protrusion of its parts in front of the tractor.

The invention will be fully and comprehensively understood from a consideration of the following detailed description when read in connection with the accompanying drawings which form part of the application, with the understanding, however, that the improvement is capable of extended application and is not confined to the exact showing of the drawings nor to the precise construction described and, therefore, such changes and modifications may be made therefrom as do not affect the spirit of the invention nor exceed the scope thereof as expressed in the appended claims.

Figure 1:
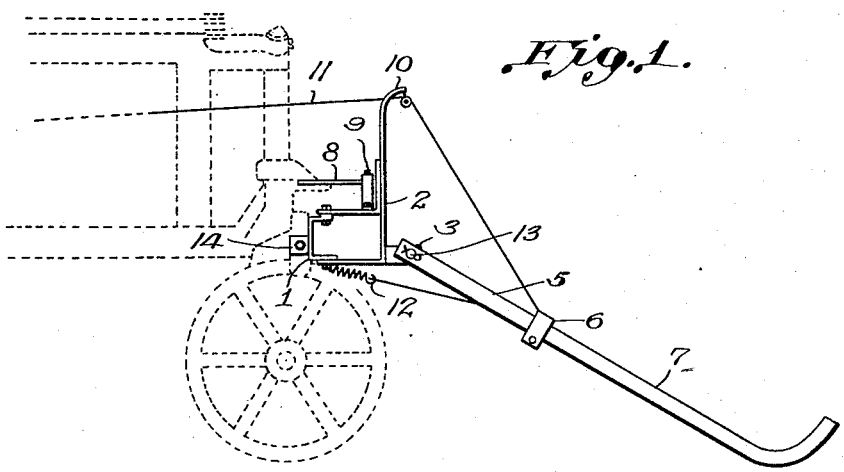
Figure 1 is a side elevation of the improvement in applied position, the tractor being indicated by the dotted lines.
Figure 2:
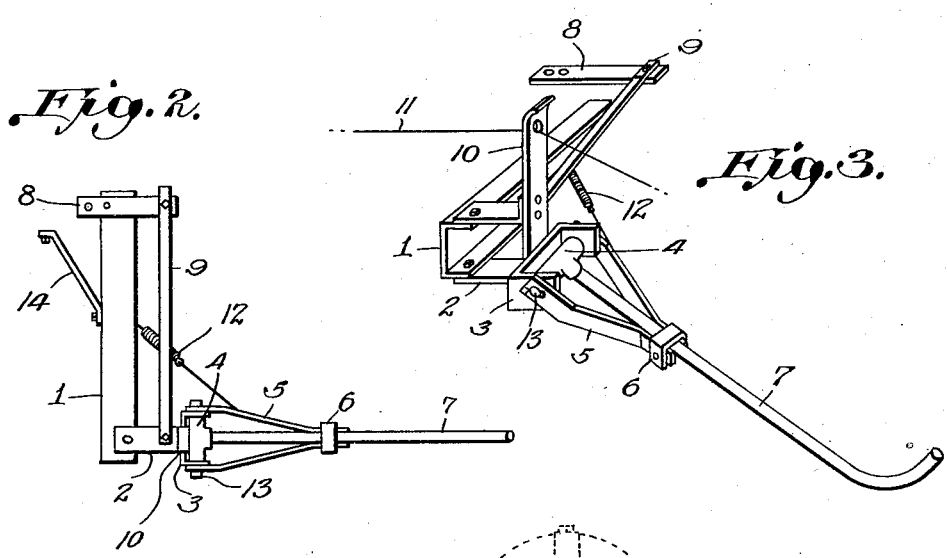
Figure 2 is a top view thereof per se.
Figure 3:
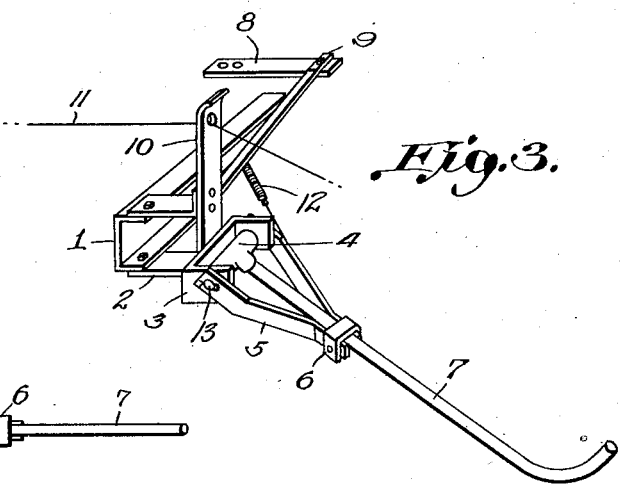
Figure 3 is a perspective view of the improvement per se.
Figure 4:
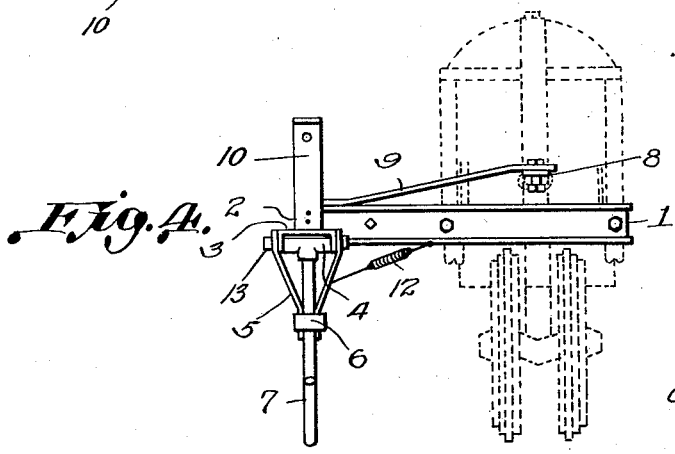
Figure 4 is a front elevation, the tractor being indicated by the dotted lines.

The mount for the front wheels of the tractor illustrated by the drawings is in the nature of a shaft or post which is journaled through a suitable column and which post is turned or held from turning by mechanism actuated by a steering wheel in close proximity to the seat of the driver. The shaft or post of the tractor also has fixed thereon and extending forwardly therefrom the cultivator shifter lever on which rests the front axle shaft spacer, which latter is in the nature of a collar or washer and has a lip extension which is slotted from its outer edge to a round opening. The cultivator shifter lever also has its outer end notched. Notched cultivator brackets project from each front corner of the tractor.

My improvement essentially includes a strong metal or wood straight bar 1 which extends horizontally across the front of the tractor and is bolted solidly thereto by means of securing elements passing through openings provided in said bar and through the notches in the cultivator brackets aforesaid. Both upper and lower faces of bar 1 are flat and form parallel planes to each other. Said bar 1 projects from one side of the front of the tractor when fastened thereto and is used as a supporting frame for other members of the device.

A clevis 2 is a flat material portion having two bends at right angles so that the resulting figure describes three sides of a rectangle. By means of openings provided in the projecting end of bar 1 and each end of clevis 2 the latter is secured to each face (upper and lower) of bar 1, proper securing elements being provided so that clevis 2 may swing freely in a horizontal plane. To the forward or closed end of clevis 2 is rigidly affixed bracket 3, a flat member having forward projecting ears, and there is passed through aligned openings in these ears a horizontal rod or shaft 13 which provides a shaft for the pipe member 7 and there are two angle braces between the ends of shaft 13 and the pipe member 7 each doing the double duty of strengthening pipe member 7 and acting as washers over the ends of shaft 13. The forward ends of said braces are firmly secured to pipe member 7 by clamp 6. Pipe member 7 has its outer end rounded upwardly to form a runner, while its inner end is secured to journal 4 which rotates on shaft 13 when the runner or pipe member 7 is raised.

A flat body, tongue 8, provided with suitable openings for the purpose is solidly affixed to the cultivator shifter lever of the tractor and when thus affixed becomes an extension of said cultivator shifter lever and has an opening provided at its outer end for the reception of a securing element which fastens to it tie rod 9. The latter extends between the tongue 8 and the outer end of clevis 2 which has an opening in its outer upper face to receive the securing element. These securing elements at each end of tie rod 9 permit said tie rod 9 to move horizontally in either direction.

Brace 14 may be affixed between bar 1 and the body of the tractor if needed for extra strength.

The tensile spring 12 is affixed between the right cultivator bracket on the tractor and a point forward of the axis upon which journal 4 rotates. Its purpose is to hold the runner in position against the wall of the furrow and when operating is somewhat extended exerting its tensile strength. When the runner is raised its point of attachment forward describes an arc to the rear and thus automatically slackens the spring so that it does not affect the free turning of the tractor.

The runner is raised by means of a cable 11 attached thereto and passing backward through an opening provided in the upright 10 for the purpose of fixing the angle of pull on the cable. The cable is pulled by the driver of the tractor either directly or by means of any lever provided for the purpose.

The runner 7 is held in the furrow not only by its own weight but by the fact that the rear end thereof is higher than the front end and any backward pressure on the front end of the runner tends to cause a downward swinging checked by the furrow bottom with the effect of resisting weight. Thus any backward pressure becomes downward pressure also.

In practice the runner following the wall of the furrow will automatically steer the tractor since the wheels must always point in the direction the runner points and any deviation from a straight line made by the runner in following the furrow compels a corresponding change in the direction taken by the wheels.

It may be well to state, however, that I am aware of guides for a similar purpose which are now in use. To the best of my knowledge none of these guides provide a properly braced construction and therefore unless made of very heavy material are liable to bend or whip. My construction permits a lighter runner construction with attendant easier operation in lifting.

For the best results in steering the tractor the front wheels of same should respond only to lateral movements of the runner when caused by the runner following the direction of the furrow. To the best of my knowledge all other guides are so constructed that the back pressure on the runner caused by friction with the soil, mounting obstacles, cleaving through litter or loose soil, or any other hindrance to forward motion, imparts a turning motion to said wheels not in conformity with the direction indicated by the furrow. My device overcomes this fault by receiving all back thrust from the runner upon the bar which is rigidly attached to the tractor frame, and in no case can said back thrust be transmitted to the wheels as a factor influencing their turning.

I may also state that a common objection to the use of all other guides is that when raised for turning they project for some distance in front of the tractor and are in the way when turning near a fence, building, or any other large obstacle. The construction of my device is such that when the runner is raised no portion of the guide projects beyond the tip of the crank of the tractor, and in effect the tractor may be driven directly against a wall and the crank thereof will first come in contact therewith. This overcomes the aforesaid objection.

The improvement may be easily and quickly attached to the tractor and as readily removed therefrom and it is believed that the foregoing will fully set the operation and advantages of my improvement to those skilled in the art to which such invention relates so that further detailed description will not be required.

Having described the invention, I claim:

1. A guide for tractors of the class described, including a straight bar with flat parallel upper and lower faces removably affixed to the frame of the tractor, a clevis jointedly affixed to the outer end of the bar and swingable horizontally, a bracket with forward projecting ears in a horizontal plane rigidly affixed to the outer end of the clevis, a shaft journaled horizontally through the ears of the bracket and carrying affixed thereto one end of a runner the outer end of which is rounded upwardly, a flat tongue removably attached to the steering post of the tractor, a tie rod connecting the outer ends of the tongue and the clevis and being swingably affixed to both, brace means between the runner and the outer ends of its supporting shaft, a tension spring secured to the runner to hold it against the wall of the furrow and relaxing its tension automatically when the runner is raised, a flexible element or cable one end secured to the runner and the other to a lever for lifting the runner, and a vertical member attached to the clevis having an opening in its upper end through which the cable is trained.

2. A guide for tractors of the type described, comprising a bar with flat horizontal parallel upper and lower faces rigidly affixed to the frame of the tractor with one end projecting to the right thereof, a clevis swingably attached to the outer end of the bar and movable horizontally, a bracket with forward projecting ears rigidly affixed to the outer end of the clevis horizontally, a shaft journaled through the ears of the bracket and carrying affixed thereto one end of a runner whose outer end is rounded upwardly, a flat tongue removably affixed to the steering post of the tractor, a tie rod connecting the outer ends of the tongue and the clevis and being swingably affixed to both, brace means between the runner and the outer ends of its supporting shaft, a tension spring between the runner and the body of the tractor to influence the runner against the wall of the furrow and relaxing when the runner is raised so that it does not while relaxed influence the turning of the tractor, a cable element for raising the runner passing from its point of attachment thereto through an opening in a vertical support on the bar to a lever near the driver of the tractor.

CHARLES H. CREED, Jr.